United States Patent
Shiizaki et al.

(10) Patent No.: US 6,882,612 B2
(45) Date of Patent: Apr. 19, 2005

(54) BCA EVALUATION DEVICE AND METHOD FOR REWRITABLE DVDS WITH DIFFERENT THRESHOLD VALUE PULSE SIGNALS

(75) Inventors: Tetsuya Shiizaki, Hirakata (JP); Saburo Kubota, Katano (JP); Katsuhiro Kida, Suita (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 353 days.

(21) Appl. No.: 10/012,646

(22) Filed: Nov. 13, 2001

(65) Prior Publication Data

US 2002/0057639 A1 May 16, 2002

(30) Foreign Application Priority Data

Nov. 16, 2000 (JP) ........................................ 2000-348882

(51) Int. Cl.⁷ .............................................. G11B 07/24
(52) U.S. Cl. .................. 369/53.36; 369/59.18
(58) Field of Search ........................... 369/53.35, 53.36, 369/59.1

(56) References Cited

U.S. PATENT DOCUMENTS

| | | | | |
|---|---|---|---|---|
| 6,034,934 A | * | 3/2000 | Miyake et al. | 369/53.28 |
| 6,034,937 A | * | 3/2000 | Kumagai | 369/47.26 |
| 6,519,213 B1 | * | 2/2003 | Song et al. | 369/44.26 |
| 6,574,422 B1 | * | 6/2003 | Kikuchi et al. | 386/105 |
| 6,661,768 B1 | * | 12/2003 | Yumiba et al. | 369/275.4 |

* cited by examiner

*Primary Examiner*—Gautam R. Patel

(57) ABSTRACT

An RF signal is read from a rewritable DVD while rotating the rewritable DVD. The read RF signal is converted to pulse signals according to different threshold values, and the number of pulses of each pulse signal is counted. Indexes IBSmin, IBMmax, IBS, and IBRmax are determined from the relationship between the counted numbers and the threshold values, and the recording quality of the BCA on the rewritable DVD is evaluated by judging whether these indexes satisfy the following inequalities:

$$IBMmax/IBSmin \leq 0.8$$

$$IBRmax/IBS \leq 1.5$$

10 Claims, 11 Drawing Sheets

BCA EVALUATION DEVICE AND METHOD FOR REWRITABLE DVDS WITH DIFFERENT THRESHOLD VALUE PULSE SIGNALS

This application is based on application No. 2000-348882 filed in Japan, the contents of which are hereby incorporated by reference.

BACKGROUND OF THE INVENTION

1. Field of the Invention

The present invention relates to a burst cutting area (BCA) evaluation device and BCA evaluation method for evaluating the recording quality of a BCA provided on a rewritable DVD.

2. Related Art

In recent years, rewritable DVDs on which the user can write data and can also overwrite have become widely available as recording media. Examples of such rewritable DVDs include a DVD-RAM, a DVD-R, a DVD–RW, and a DVD+RW. A burst cutting area (BCA) of a rewritable DVD is a circular zone near the center of the disc. In the BCA, additional information such as a serial number unique to the disc is recorded in barcode format using a laser.

Figure 1:
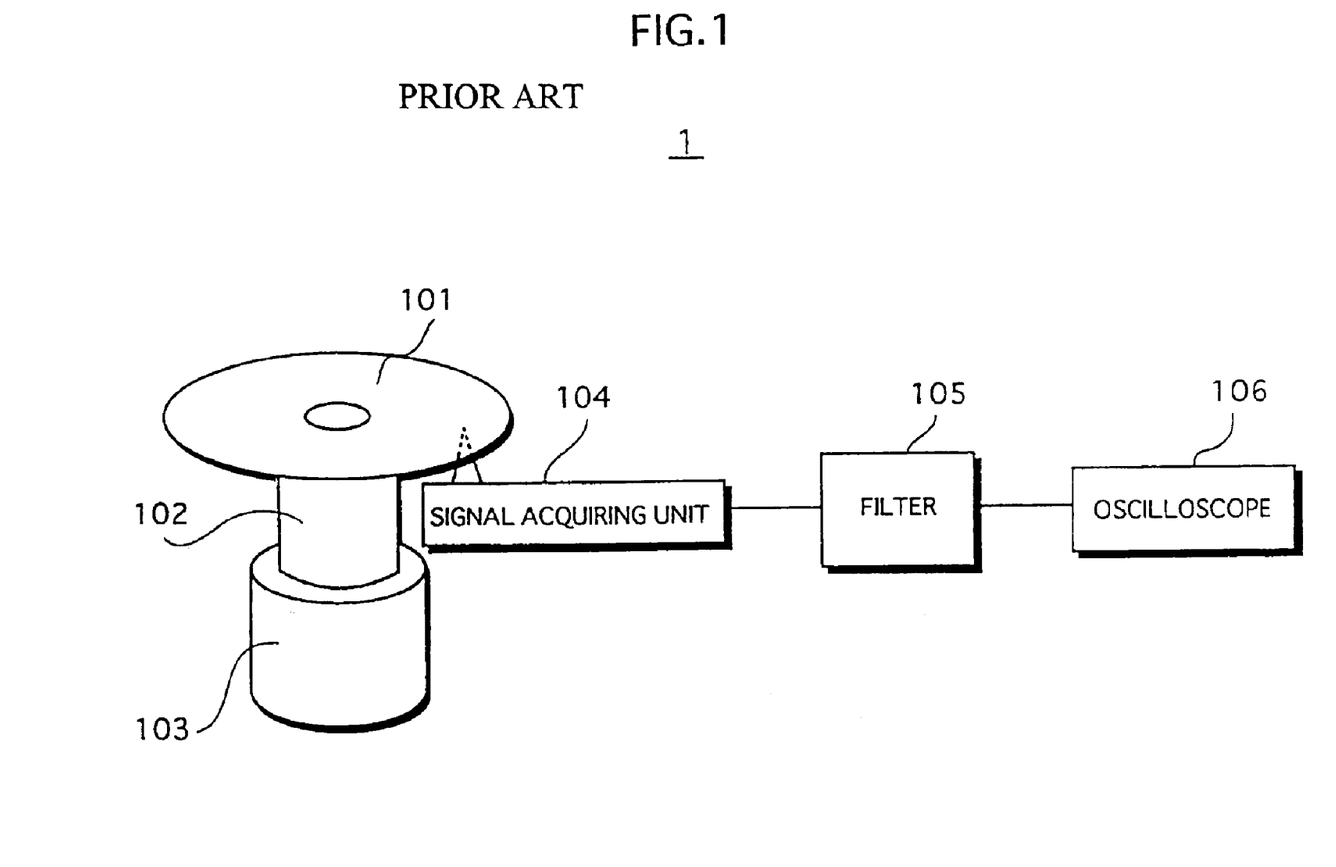
FIG. 1 shows a construction of a measuring instrument according to the related art, together with a rewritable DVD which is subjected to evaluation.

Conventionally, the quality of the data recorded in the BCA is evaluated as follows. The signal waveform of each RF signal including a BCA signal corresponding to the barcode is displayed using an oscilloscope, and a visual check is made as to whether the absolute value of the signal satisfies predetermined standards. FIG. 1 shows a construction of a measuring instrument used for such a visual check. The drawing also shows a rewritable DVD that is subjected to the evaluation.

In the drawing, a measuring instrument 1 holds a rewritable DVD 101 by means of a shaft 102. A motor 103 rotates this rewritable DVD 101. While doing so, a signal acquiring unit 104 reads an RF signal, and a filter 105 filters the read RF signal. An oscilloscope 106 displays the filtered RF signal.

In one rewritable DVD, the number of bars of a barcode to be checked is around 4000 at the maximum and 2000 on average. Therefore, when a BCA signal corresponding to the barcode is visually observed to check whether all of these bars satisfy the standards, oversights or reading mistakes are inevitable. In other words, the reliability of the evaluation result obtained by such a visual check cannot be fully ensured. Besides, this method requires a great deal of time and manpower.

SUMMARY OF THE INVENTION

The present invention was conceived in view of the problem described above, and has an object of providing a BCA evaluation device and BCA evaluation method that can evaluate the recording condition of a BCA more quickly and accurately.

The stated object can be achieved by a BCA evaluation device for evaluating a recording condition of a BCA on a rewritable DVD, including: a signal receiving unit for receiving a signal read from the rewritable DVD; a threshold generating unit for generating different threshold values; a pulse signal generating unit for generating pulse signals which are each a result of comparing the read signal with a different one of the threshold values; a pulse counting unit for counting a number of pulses of each pulse signal, and outputting counted numbers; and an evaluating unit for evaluating the recording condition of the BCA, based on a correspondence between the threshold values and the numbers.

The stated object can also be achieved by a BCA evaluation method for evaluating a recording condition of a BCA on a rewritable DVD, including: a signal receiving step for receiving a signal read from the rewritable DVD; a threshold generating step for generating different threshold values; a pulse signal generating step for generating pulse signals which are each a result of comparing the read signal with a different one of the threshold values; a pulse counting step for counting a number of pulses of each pulse signal, and outputting counted numbers; and an evaluating step for evaluating the recording condition of the BCA, based on a correspondence between the threshold values and the numbers.

With the above construction and method, the recording condition of a BCA can be evaluated quickly and accurately, with no need to employ a lot of manpower.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings:

FIG. 6 shows the relationship between an RF signal and a pulse signal, where FIG. 6(a) is a graph illustrating the RF signal output from a filtering unit shown in FIG. 2 and FIG. 6(b) is a graph illustrating the pulse signal generated by a pulse signal generating unit shown in FIG. 2 responsive to the input of the RF signal;

DESCRIPTION OF THE PREFERRED EMBODIMENT

The following describes a BCA evaluation device which is an embodiment of the present invention, with reference to the drawings.

(1. Overall Construction)

Figure 2:
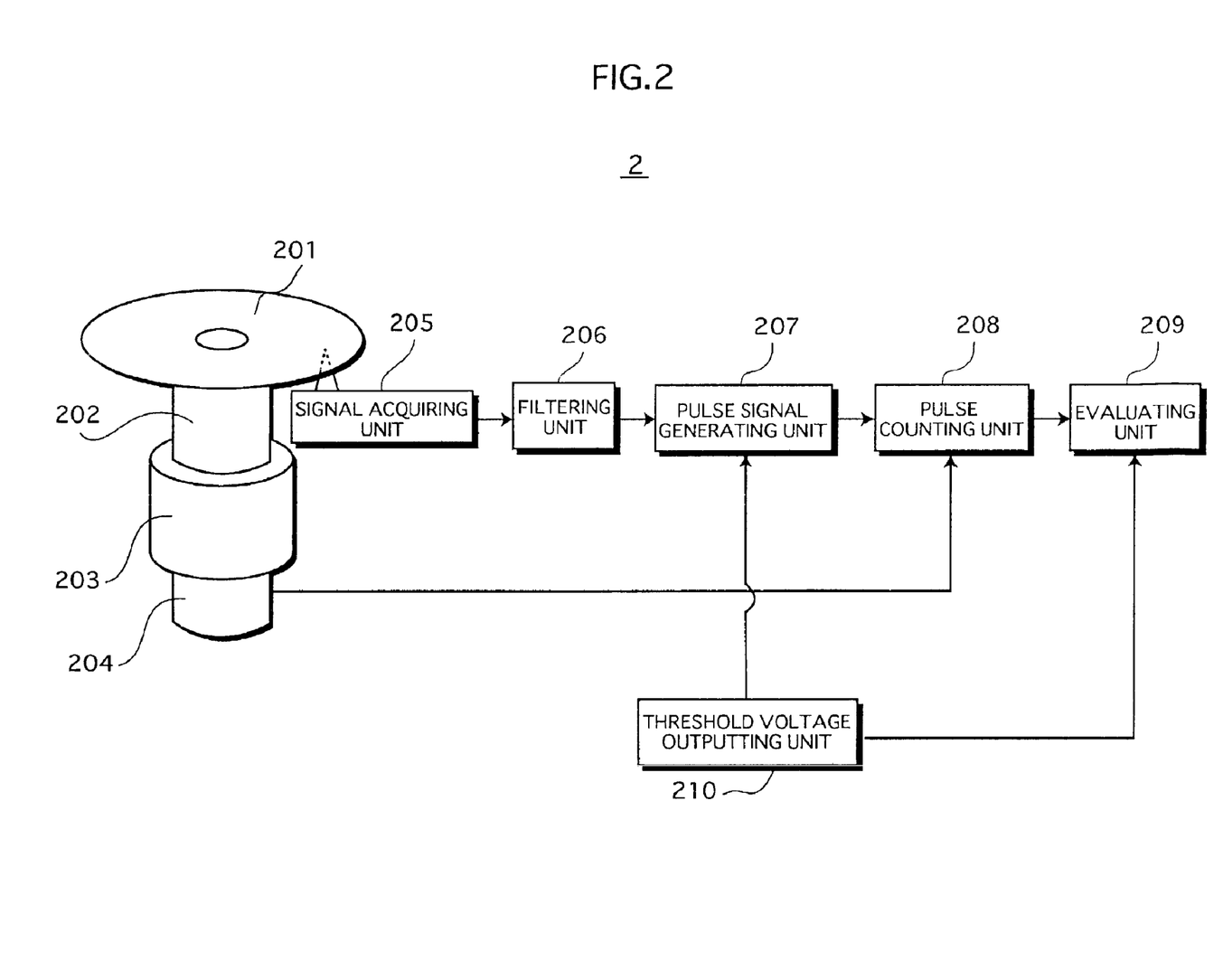
FIG. 2 is a block diagram showing a construction of a BCA evaluation device for rewritable DVDs according to an embodiment of the present invention, together with a rewritable DVD which is subjected to evaluation.

FIG. 2 is a block diagram showing a construction of a BCA evaluation device (hereafter simply referred to as an "evaluation device") 2 for rewritable DVDs, to which the embodiment of the present invention relates. The drawing also shows a rewritable DVD (hereafter simply a "DVD") 201 that is subjected to evaluation. A shaft 202 has a chuck function and holds the DVD 201. A motor 203 rotates the shaft 202. An encoder 204 is attached to the motor 204. The encoder 204 generates a pulse, each time the shaft 202, i.e. the DVD 201, makes one rotation.

A signal acquiring unit 205 reads information recorded on the DVD 201, converts it to an electric signal, and outputs the electric signal to a filtering unit 206. The filtering unit 206 filters the signal output from the signal acquiring unit 205 to remove noise, using a tertiary low-pass filter (a cutoff frequency of 1.2 MHz) as an example. The filtering unit 206 outputs the filtered signal to a pulse signal generating unit 207. Meanwhile, a threshold voltage outputting unit 210 generates a threshold voltage and outputs it to the pulse signal generating unit 207.

The pulse signal generating unit 207 performs binarization on the signal output from the filtering unit 206, by comparing the signal with the threshold voltage. The pulse signal generating unit 207 outputs a pulse signal generated as a result of this binarization, to a pulse counting unit 208. The pulse counting unit 208 counts pulses of the pulse signal output from the pulse signal generating unit 207, and outputs the pulse count to an evaluating unit 209. Note that the threshold voltage outputting unit 210 also outputs the threshold voltage to the evaluating unit 209.

Here, the pulse counting unit 208 resets the pulse count each time the DVD 201 makes one rotation, based on the signal output from the encoder 204. Once it is confirmed that the pulse count made for the pulse signal which is generated using the threshold voltage each time the DVD 201 makes one rotation has reached stability, the pulse counting unit 208 outputs the pulse count to the evaluating unit 209. After this, the threshold voltage outputting unit 210 outputs a new threshold voltage.

(2. Circuit Construction of the Threshold Voltage Outputting Unit 210)

Figure 3:
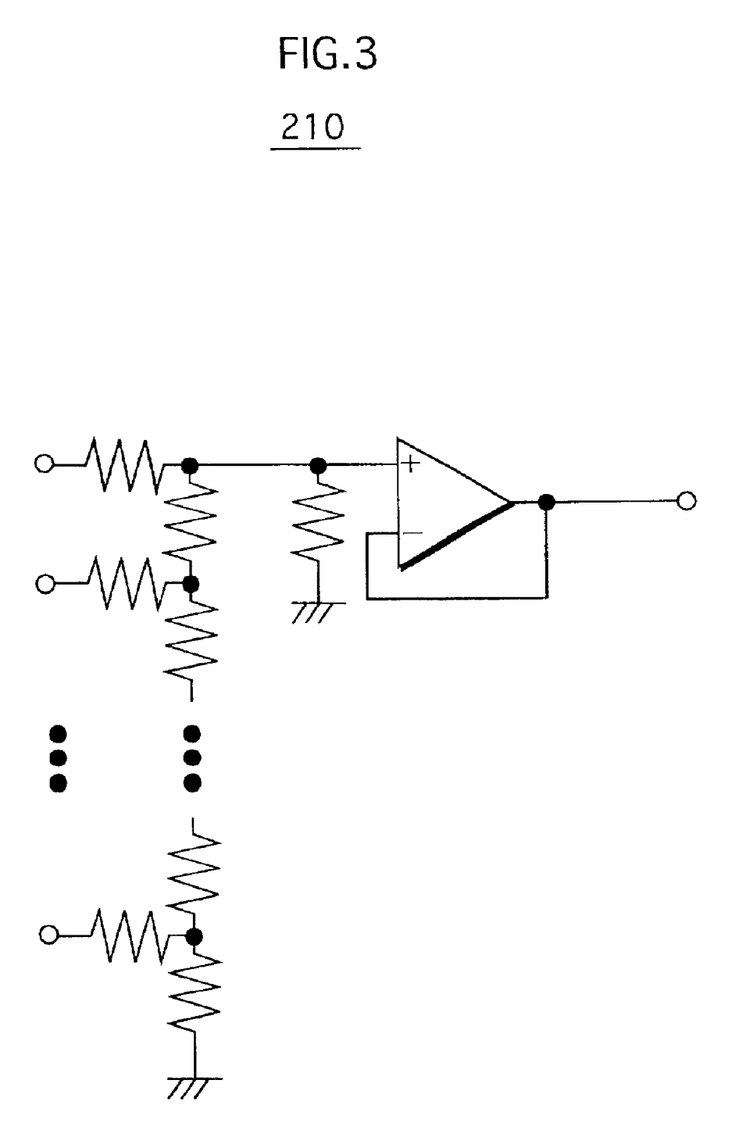
FIG. 3 shows a circuit construction of a threshold voltage outputting unit shown in FIG. 2.

FIG. 3 shows a circuit construction of the threshold voltage outputting unit 210. As illustrated, the threshold voltage outputting unit 210 is a D/A converter of a ladder resistance type, and generates a threshold voltage responsive to the input of 10-bit parallel data. In more detail, after the pulse counting unit 208 outputs the pulse count to the evaluating unit 209, the threshold voltage outputting unit 210 receives new parallel data and outputs a new threshold voltage responsive to the new parallel data.

(3. Circuit Construction and Operation of the Pulse Counting Unit 208)

Figure 4:
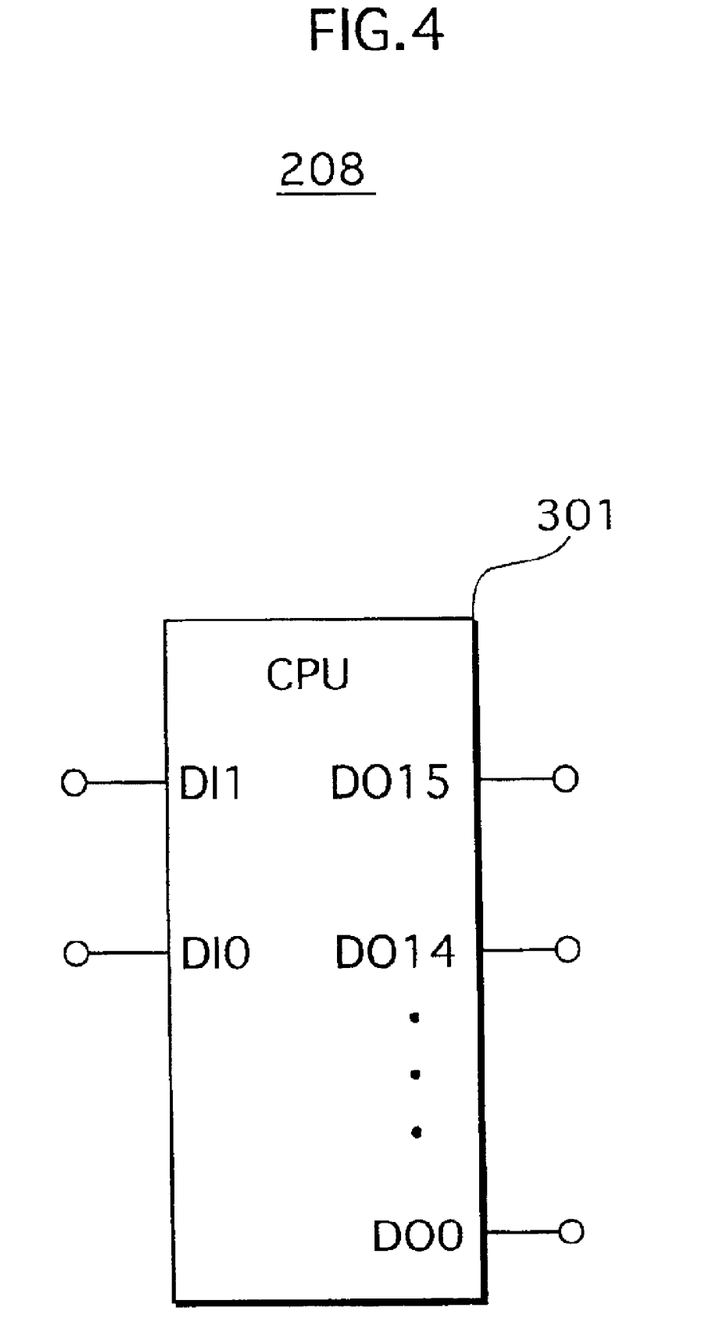
FIG. 4 shows a circuit construction of a pulse counting unit shown in FIG. 2.

FIG. 4 shows a circuit construction of the pulse counting unit 208. In the drawing, the pulse counting unit 208 is made up of a single CPU 301. The signal output from the encoder 204 is received at digital input terminal DI0, whereas the pulse signal output from the pulse signal generating unit 207 is received at digital input terminal DI1.

The CPU 301 has a 16-bit internal counter. With this counter, the CPU 301 counts up pulses of the pulse signal received from the pulse signal generating unit 207, and outputs the pulse count to the evaluating unit 209 as 16-bit data via digital output terminals DO0–DO15.

Figure 5:
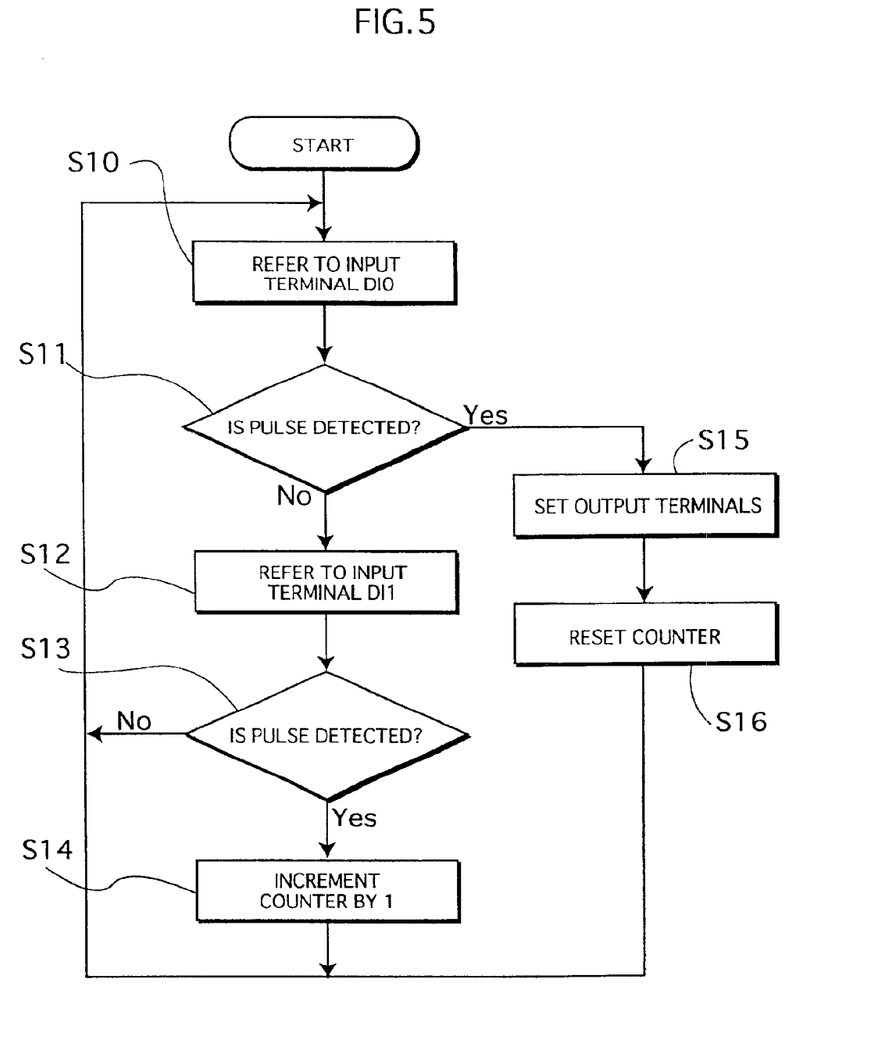
FIG. 5 is a flowchart showing an operation of a CPU shown in FIG. 4.

FIG. 5 is a flowchart showing an operation of the CPU 301. First, the CPU 301 refers to input terminal DI0 (S10). If a pulse has been received from the encoder 204 (S11:Yes), the CPU 301 sets the value of the internal counter to output terminals DO0–DO15, to notify the evaluating unit 209 of the number of pulses (S15). Following this, the CPU 301 resets the internal counter to 0 (S16).

If a pulse has not been received from the encoder 204 (S11:No), the CPU 301 refers to input terminal DI1 (S12). Upon detecting a pulse in a pulse signal received from the pulse signal generating unit 207 (S13:Yes), the CPU 301 increments the internal counter by 1 (S14). If the judgement "No" is given in step S13 or after step S14 of S16 ends, the CPU 301 returns to step S10 to repeat the operation.

The detection of a pulse in step S13 can be done by detecting a leading edge or trailing edge of the pulse signal received from the pulse signal generating unit 207.

(4. Operation of the Evaluating Unit 209)

An operation of the evaluating unit 209 is explained in detail below.

Figure 6:
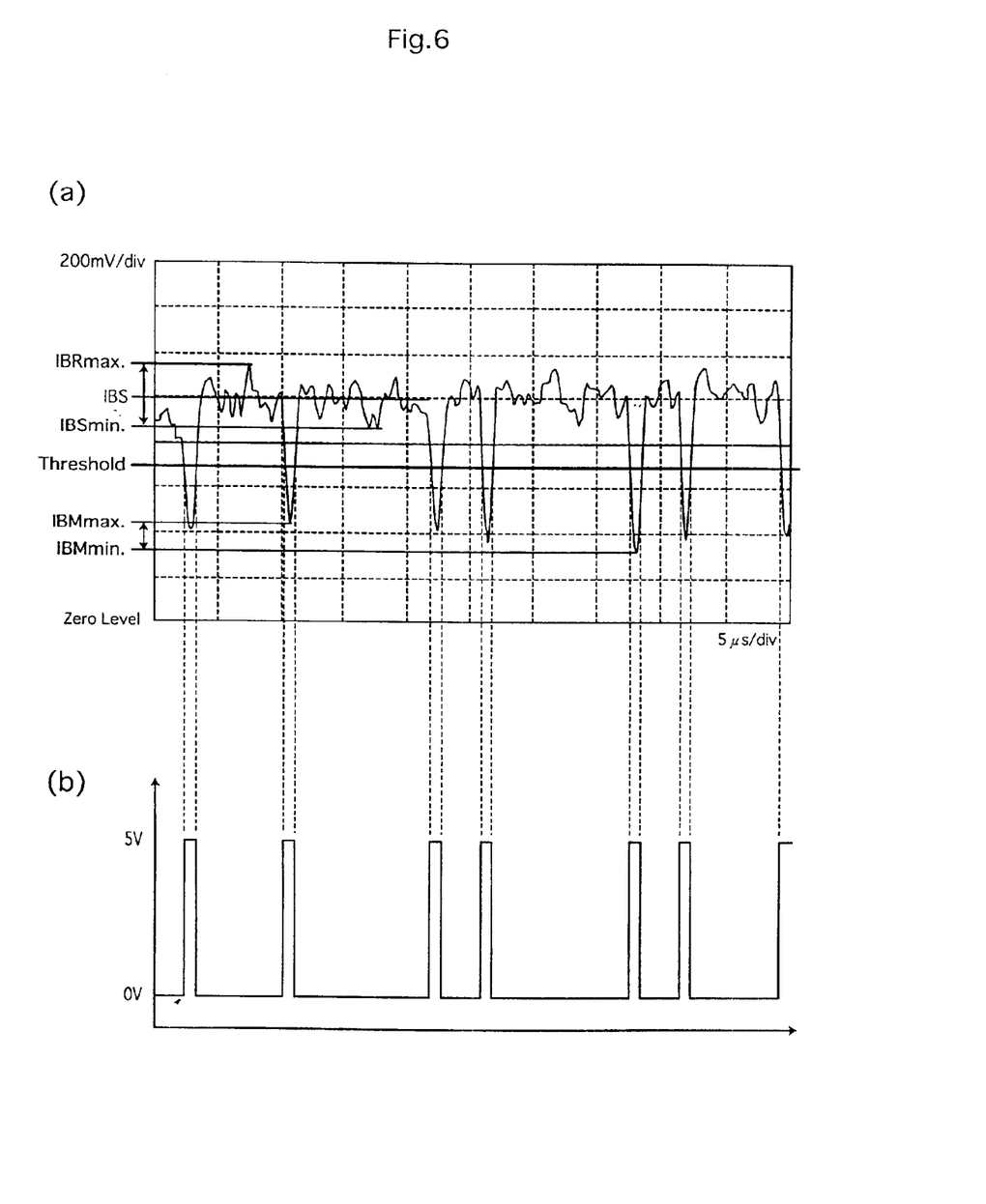

FIG. 6 shows the relationship between an RF signal and a pulse signal. In more detail, FIG. 6(a) is a graph showing the RF signal output from the filtering unit 206, whereas FIG. 6(b) is a graph showing the pulse signal generated by the pulse signal generating unit 207 responsive to the input of the RF signal. In FIG. 6(a), the horizontal axis represents time, while the vertical axis represents the voltage of the RF signal. The graph in FIG. 6(a) has been divided with broken lines by 5 µsec in time and 200 mV in voltage, for the sake of convenience.

In the drawing, IBMmin is the lowest voltage of an RF signal which is a BCA signal, whereas IBMmax is the highest voltage of such an RF signal. IBSmin, IBS, and IBRmax are the lowest, mean, and highest voltages of an RF signal which is not a BCA signal. Also, Threshold denotes a threshold voltage. In FIG. 6(b), the horizontal axis represents time, while the vertical axis represents the voltage of the pulse signal. The pulse signal is schematically shown in FIG. 6(b).

As shown in FIG. 6, the pulse signal generating unit 207 detects a BCA signal whose voltage is below the threshold voltage from the RF signal, and binalizes the BCA signal to generate the pulse signal. As can be seen from the drawing, if the threshold voltage is changed, the pulse signal to be generated by the pulse signal generating unit 207 changes. As the pulse signal changes, the pulse count to be output by the pulse counting unit 208 changes, too.

Figure 7:
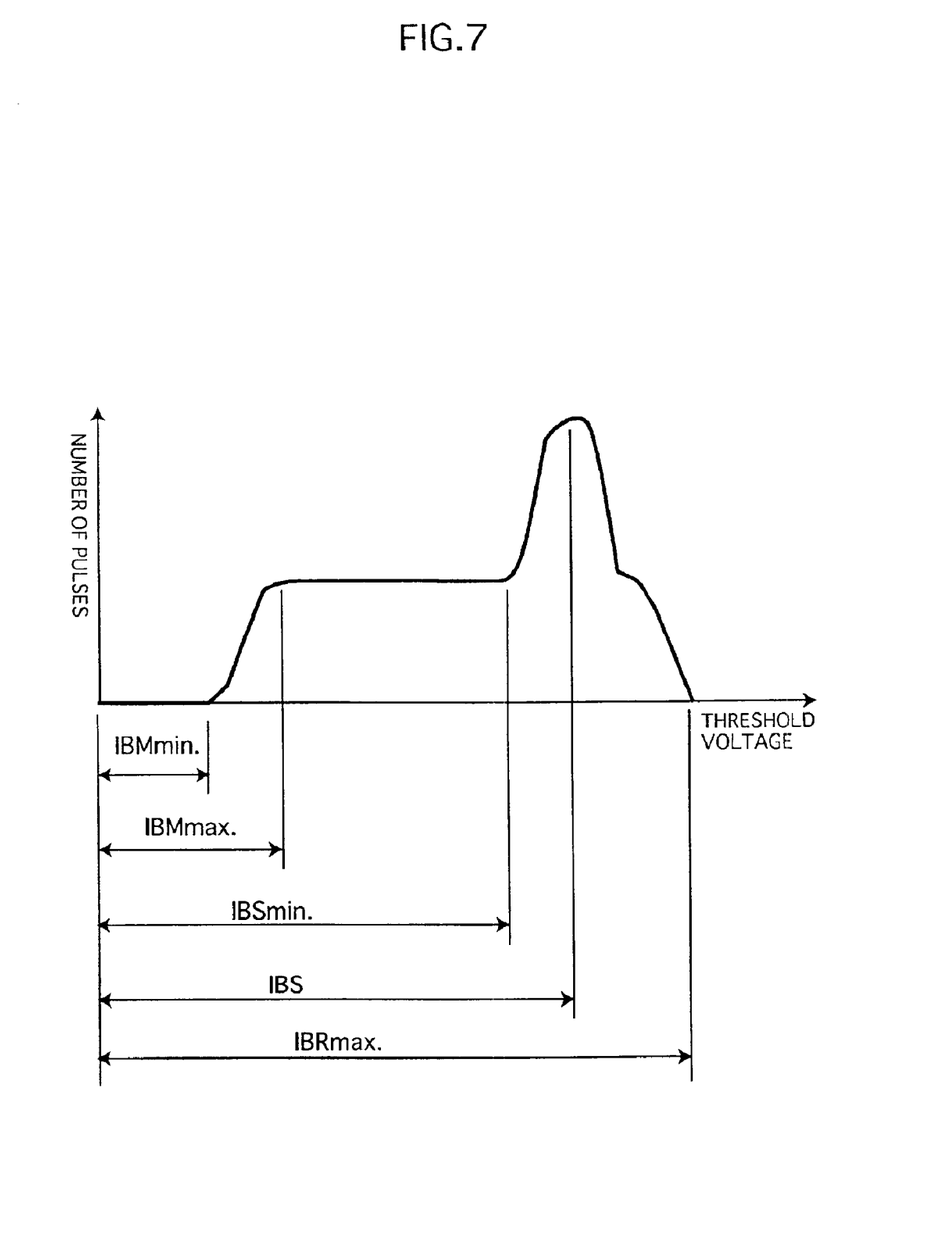
FIG. 7 is a graph showing a typical example of the relationship between threshold voltages and pulse counts output from the pulse counting unit.

FIG. 7 is a graph showing a typical example of the relationship between the threshold voltage and the pulse count output from the pulse counting unit 208. When the threshold voltage outputting unit 210 increases the threshold voltage, the pulse count changes from 0 to 1 at some threshold voltage. This threshold voltage at which the pulse count changes to 1 is set as IBMmin.

After this, the pulse count increases with the threshold voltage. Then a section in which the pulse count is unchanged appears even if the threshold voltage continues to increase. The threshold voltage at the beginning of this section, i.e. the threshold voltage at which the pulse count stops changing, is set as IBMmax.

When the threshold voltage is further increased, the pulse count begins to increase once again. The threshold voltage at the end of the aforementioned section, i.e. the threshold voltage at which the pulse count restarts increasing, is set as IBSmin. After continuing to increase with the threshold voltage, the pulse count begins to decrease, and eventually reaches 0. The threshold voltage at which the pulse count reaches 0 is set as IBRmax. Also, the threshold voltage at which the pulse count is largest is set as IBS.

Thus, while changing the threshold voltage, the number of pulses is counted for each different threshold voltage. As a result, indexes IBMmin, IBMmax, IBSmin, IBS, and IBRmax that characterize the quality of the BGA signal can be obtained from the way the number of pulses change with the threshold voltage.

According to DVD standards (DVD Specifications for Rewritable Disc (DVD-RAM) Part 1, PHYSICAL SPECIFICATIONS Version 2.0, September 1999), a BCA signal needs to satisfy the following quality conditions:

$$IBMmax/IBSmin \leq 0.8 \quad (1)$$

$$IBRmax/IBS \leq 1.5 \quad (2)$$

In other words, by assigning the indexes obtained in the above manner to inequalities (1) and (2), the BCA signal can be evaluated as to whether it satisfies the quality conditions required by the DVD standards. In this way, the evaluating unit 209 evaluates whether the BCA signal achieves a predetermined level of quality. This evaluation of the BCA signal can be regarded as the evaluation of the quality of various information recorded in the BCA.

Figure 8:
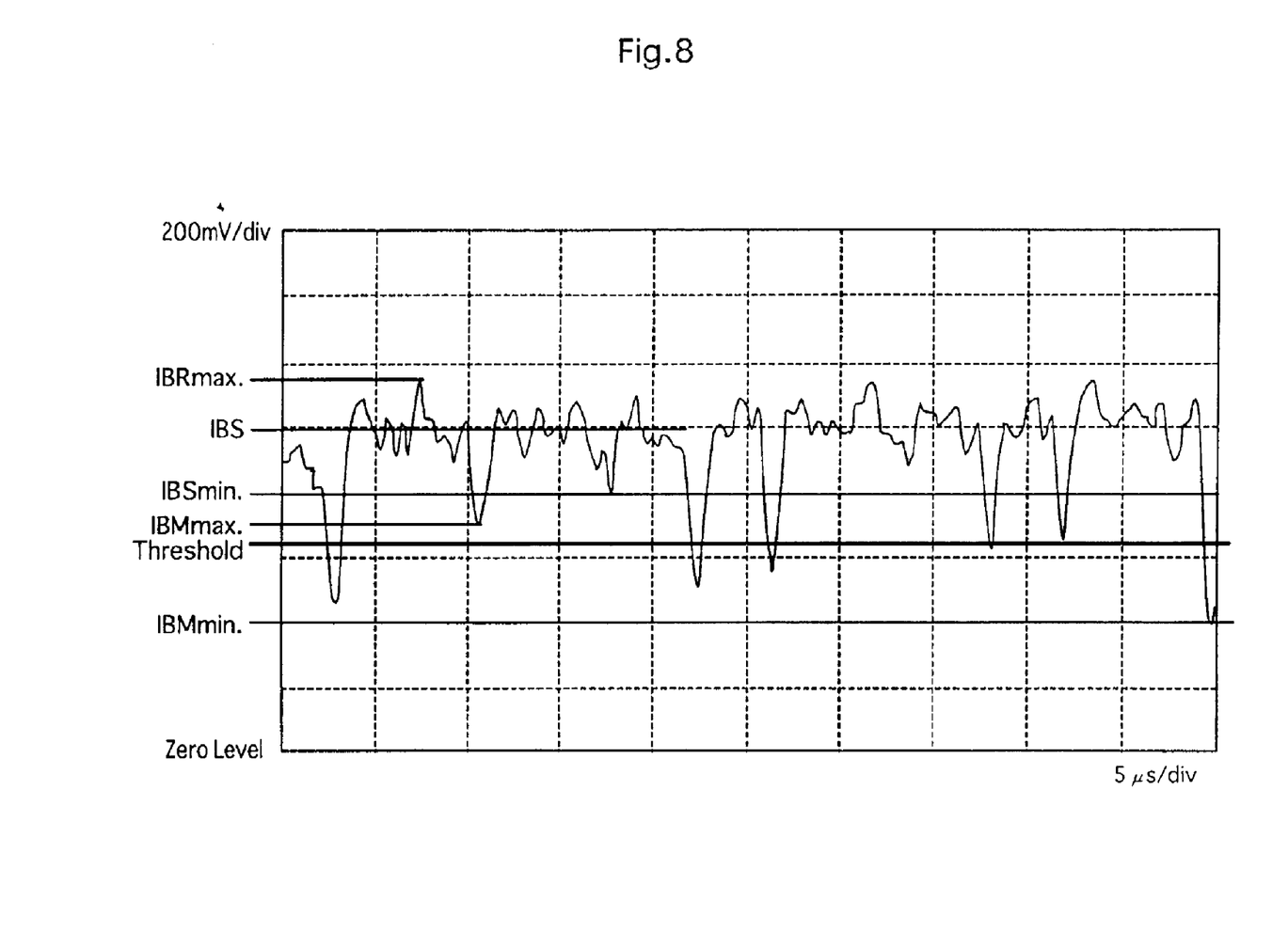
FIG. 8 is a graph showing an example RF signal output from the filtering unit that satisfies inequality (2) but does not satisfy inequality (1)
Figure 9:
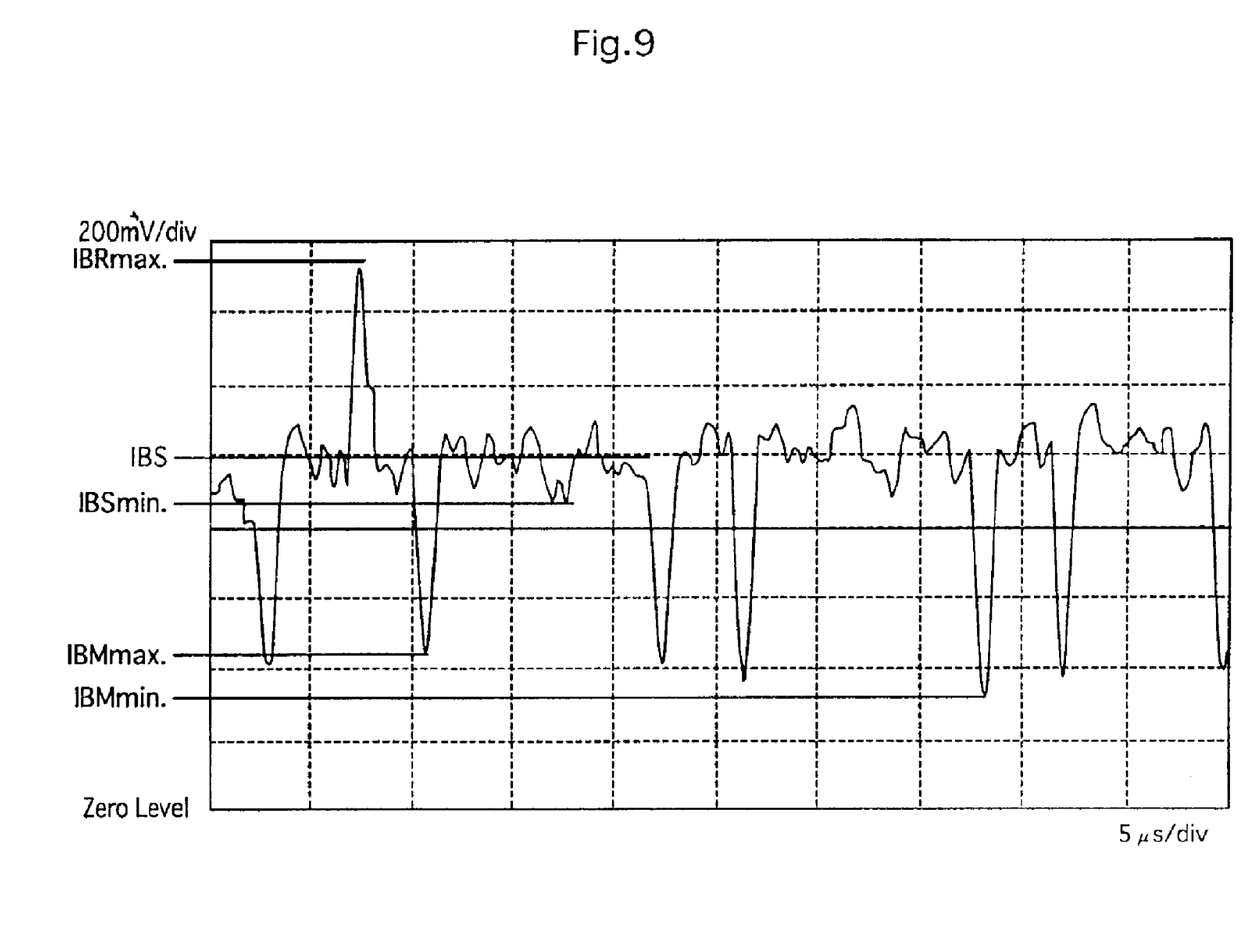
FIG. 9 is a graph showing an example RF signal output from the filtering unit that satisfies inequality (1) but does not satisfy inequality (2)

The RF signal shown in FIG. 6 satisfies both inequalities (1) and (2). However, an RF signal shown in FIG. 8 does not satisfy inequality (1), though it satisfies inequality (2). On the other hand, an RF signal shown in FIG. 9 satisfies inequality (1) but does not satisfy inequality (2). The RF signals shown in FIGS. 6, 8, and 9 appear to be similar at first glance. It is difficult to distinguish them visually.

This demonstrates that the embodied method of judging whether an RF signal satisfies inequalities (1) and (2) is an effective way to evaluate the recording quality of a BCA.

It should be noted once again that a rewritable DVD means a DVD, such as a DVD-RAM, a DVD-R, a DVD-RW, or a DVD+RW, on which the user can write data and can also erase or overwrite.

In the above embodiment, the motor 203 rotates the DVD 201 at a substantially constant rotational speed of 3246 rpm, so that the RF signal to be evaluated can be measured more accurately.

Also, the evaluating unit 209 may determine the smallest threshold voltage in the largest section in which the pulse count is unchanged at a positive number as IBMmax, and the largest threshold voltage in the same section as IBSmin.

(Modifications)

Though the present invention has been described based on the embodiment, the invention should not be limited to such. For instance, the following modifications are possible.

(1) The above embodiment describes the case where the evaluating unit 209 judges the recording quality of the BCA, but this may be modified as follows. The evaluating unit 209 shown in FIG. 2 is replaced with a count displaying unit for displaying a pulse count obtained for each different threshold voltage, to enable the operator to judge the recording quality of the BCA based on the display.

Here, the threshold voltage corresponding to the pulse count may also be displayed. Moreover, the display may be made in the form of graph as shown in FIG. 7.

If the relationship between the threshold voltage and the pulse count greatly differs with the typical relationship illustrated in FIG. 7, the evaluating unit 209 may not be able to determine some or all of the indexes such as IBMmin appropriately and as a result may not be able to make a proper evaluation. With the provision of the count displaying unit, however, the operator can evaluate the BCA properly.

(2) The above embodiment describes the case where the size of the internal counter in the CPU 301 is 16 bits, but this is not a limit for the invention, which can use a counter of an optimal size as necessary. If the counter size is too small, indexes such as IBS cannot be determined properly. Hence it is preferable to employ a counter of a sufficient size. Also, the size of the parallel data received by the threshold voltage outputting unit 210 is not limited to 10 bits. An optimal data size can be chosen as necessary.

(3) The above embodiment describes the case where the RF signal is read from the DVD 201 each time the number of pulses is counted, but this may be modified as follows. The RF signal read while the DVD 201 makes one rotation is stored, with the stored RF signal being put to use for counting the number of pulses using each different threshold value. This eliminates the need for rotating the DVD 201 over and over again, with it being possible to save physical trouble required for BCA evaluation.

(4) In the above embodiment, when it is confirmed that the number of pulses counted for one threshold voltage each time the DVD 201 makes one rotation has reached stability, the pulse counting unit 208 outputs the pulse count to the evaluating unit 209. This confirmation can be carried out in the following ways.

(4-1) The pulse count obtained in each rotation of the DVD 201 is displayed to let the operator judge whether the pulse count has reached stability. Upon judging the pulse count as becoming stable, the operator instructs the threshold voltage outputting unit 210 to output a new threshold voltage. Here, the new threshold voltage to be output by the threshold voltage outputting unit 210 may be a voltage which has been set beforehand, or a voltage which is designated by the operator.

(4-2) The pulse counting unit 208 judges the pulse count as reaching a condition of stability and outputs the pulse count to the evaluating unit 208, when the results of a predetermined number of consecutive counting operations end up being the same. The pulse counting unit 208 then instructs the threshold voltage outputting unit 210 to output a new threshold voltage.

Figure 10:
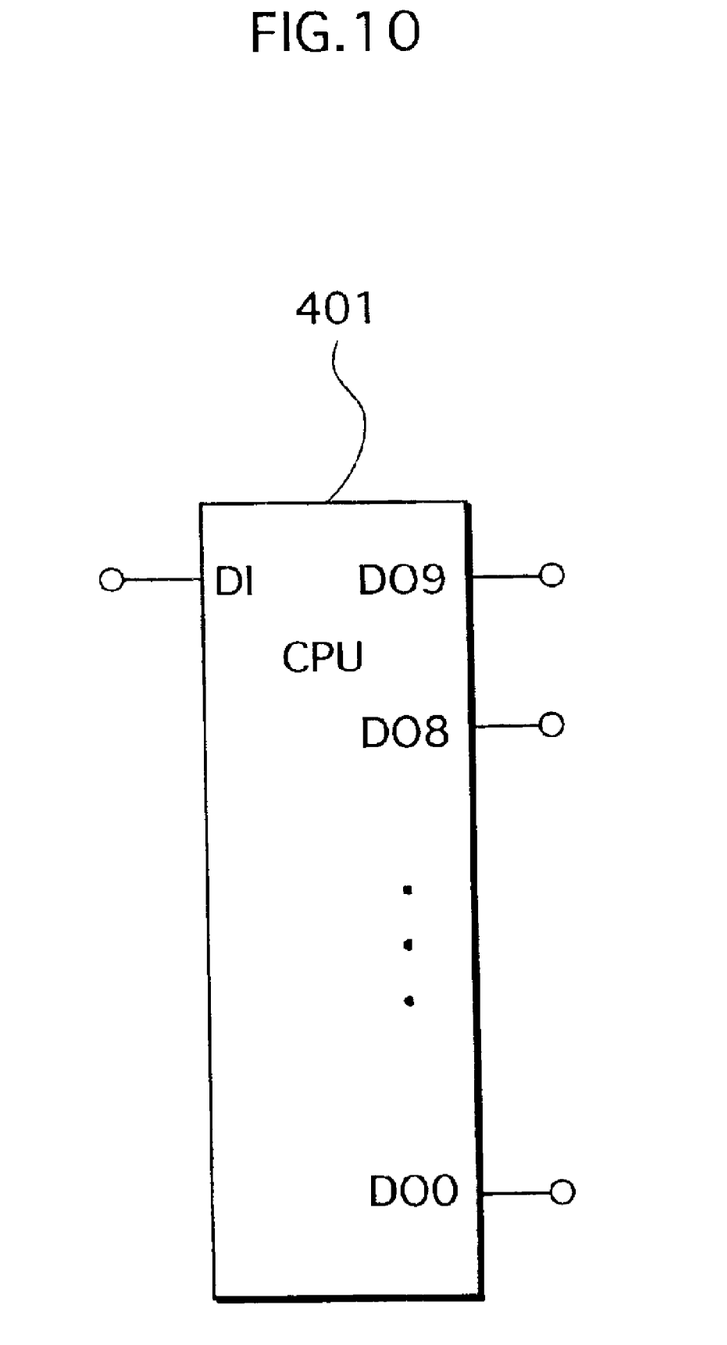
FIG. 10 shows a construction of a circuit that inputs 10-bit parallel data to the threshold voltage outputting unit to indicate a threshold voltage.

FIG. 10 shows a construction of a circuit which inputs 10-bit parallel data to the threshold voltage outputting unit 210 to indicate a threshold voltage (hereafter, a "threshold voltage indicating unit"). In the drawing, the threshold voltage indicating unit is made up of a CPU 401. Digital input terminal DI is used to receive an instruction to output a new threshold voltage from the pulse counting unit 208, whereas digital output terminals DO0–DO9 are used to output 10-bit parallel data to the threshold voltage outputting unit 210.

The CPU 401 has an internal counter. Each time an instruction to output a new threshold voltage is issued from the pulse counting unit 208, the CPU 401 increments the internal counter by 1. The CPU 401 also has an internal RAM that prestores parallel data corresponding to each counter value.

Figure 11:
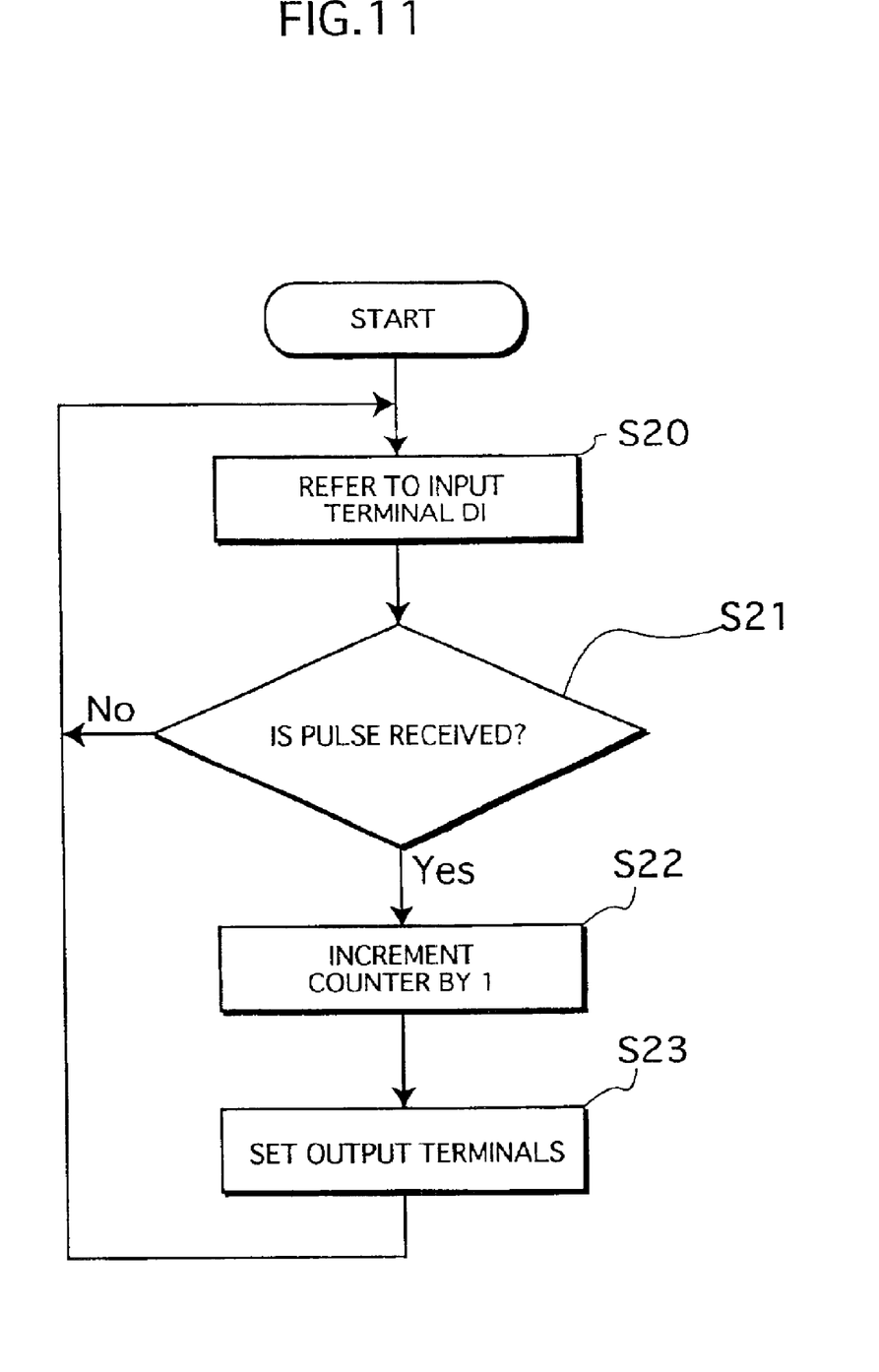
FIG. 11 is a flowchart showing an operation of a CPU shown in FIG. 10.

FIG. 11 is a flowchart showing an operation of the CPU 401. First, the CPU 401 refers to input terminal DI (S20). If a pulse has not been received from the pulse counting unit 208 (S21:No), the CPU 401 returns to step S20. If a pulse has been received (S21:Yes), the CPU 401 increments the internal counter by 1 (S22), reads parallel data corresponding to the value of the internal counter from the internal RAM, and outputs it via output terminals DO0–DO9 (S23). For example, when parallel data is 3, output terminals DO0 and DO1 are set at ON and remaining output terminals DO2–DO9 are set at OFF. After step S23, the CPU 401 returns to step S20 to repeat the operation.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A BCA (Burst Cutting Area) evaluation device for evaluating a recording condition of a BCA on a rewritable DVD, comprising:

signal receiving unit operable to receiving a signal read from the rewritable DVD;

threshold generating unit operable to generating different threshold values;

pulse signal generating unit operable to generating pulse signals which are each a result of comparing the read signal with a different one of the threshold values;

pulse counting unit operable to counting a number of pulses of each pulse signal, and outputting counted numbers; and evaluating unit operable to evaluating the record condition of the BCA, based on a correspondence between the threshold values and the numbers, wherein the evaluating unit evaluates the recording condition of the ECA, by judging whether IBSmin, IBMmax, IBS, and IBRmax that are determined based on the correspondence between the threshold values and the numbers satisfy the following two inequalities:

$$IBMmax/IBSmin \leq 0.8$$

$$IBRmax/IBS \leq 1.5$$

wherein
   IBSmin is the lowest voltage of an RF signal which is not a BCA signal,
   IBMmax is the highest voltage of the RF signal,
   IBS is the mean average of the RF signal which is not the BCA signal, and
   IBRmax is the highest voltage of the RF signal which is not the BCA signal.

2. The BCA evaluation device of claim 1,
   wherein the threshold generating unit generates threshold voltages as the threshold values, and
   the evaluating unit sets, as IBMmax, a smallest threshold voltage in a group of threshold voltages, the group being a largest group of threshold voltages which correspond to an equivalent positive number.

3. The BCA evaluation device of claim 1,
   wherein the threshold generating unit generates threshold voltages as the threshold values, and
   the evaluating unit sets, as IBSmin, a largest threshold voltage in a group of threshold voltages, the group being a largest group of threshold voltages which correspond to an equivalent positive number.

4. The BCA evaluation device of claim 1,
   wherein the threshold generating unit generates threshold voltages as the threshold values, and
   the evaluating unit sets, as IBS, a threshold voltage that corresponds to a largest number.

5. The BCA evaluation device of claim 1,
   wherein the threshold generating unit generates threshold voltages as the threshold values, and
   the evaluating unit sets, as IBRmax, a largest threshold voltage of threshold voltages which correspond to positive numbers.

6. A BCA (Burst Cutting Area) evaluation method for evaluating a recording condition of a BCA on a rewritable DVD, comprising:

a signal receiving step of receiving a signal read from the rewritable DVD;

a threshold generating step of generating different threshold values;

pulse signal generating step of generating pulse signals which are each a result of comparing the read signal with a different one of the threshold values;

pulse counting step of counting a number of pulses of each pulse signal, and outputting counted numbers; and evaluating unit of evaluating the record condition of the BCA, based on a correspondence between the threshold values and the numbers, wherein the evaluating step evaluates the recording condition of the BCA, by judging whether IBSmin, IBMmax, IBS, and IBRmax that are determined based on the correspondence between the threshold values and the numbers satisfy the following two inequalities:

$$IBMmax/IBSmin \leq 0.8$$

$$IBRmax/IBS \leq 1.5$$

wherein
   IBSmin is the lowest voltage of an RF signal which is not a BCA signal,
   IBMmax is the highest voltage of the RF signal,
   IBS is the mean average of the RF signal which is not the BCA signal, and
   IBRmax is the highest voltage of the RF signal which is not the BCA signal.

7. The BCA evaluation method of claim 6,
   wherein the threshold generating step generates threshold voltages as the threshold values, and
   the evaluating step sets, as IBMmax, a smallest threshold voltage in a group of threshold voltages, the group being a largest group of threshold voltages which correspond to an equivalent positive number.

8. The BCA evaluation method of claim 7,
   wherein the threshold generating step generates threshold voltages as the threshold values, and the evaluating step sets, as IBSmin, a largest threshold voltage in a group of threshold voltages, the group being a largest group of threshold voltages which correspond to an equivalent positive number.

9. The BCA evaluation method of claim 6,
   wherein the threshold generating step generates threshold voltages as the threshold values, and
   the evaluating step sets, as IBS, a threshold voltage that corresponds to a largest number.

10. The BCA evaluation method of claim 6,
    wherein the threshold generating step generates threshold voltages as the threshold values, and
    the evaluating step sets, as IBRmax, a largest threshold voltage of threshold voltages which correspond to positive numbers.

* * * * *